Nov. 28, 1967
E. J. JEMAL
3,355,255
APPARATUS FOR RECOVERY OF TALLOW
Filed Oct. 8, 1965
3 Sheets-Sheet 1
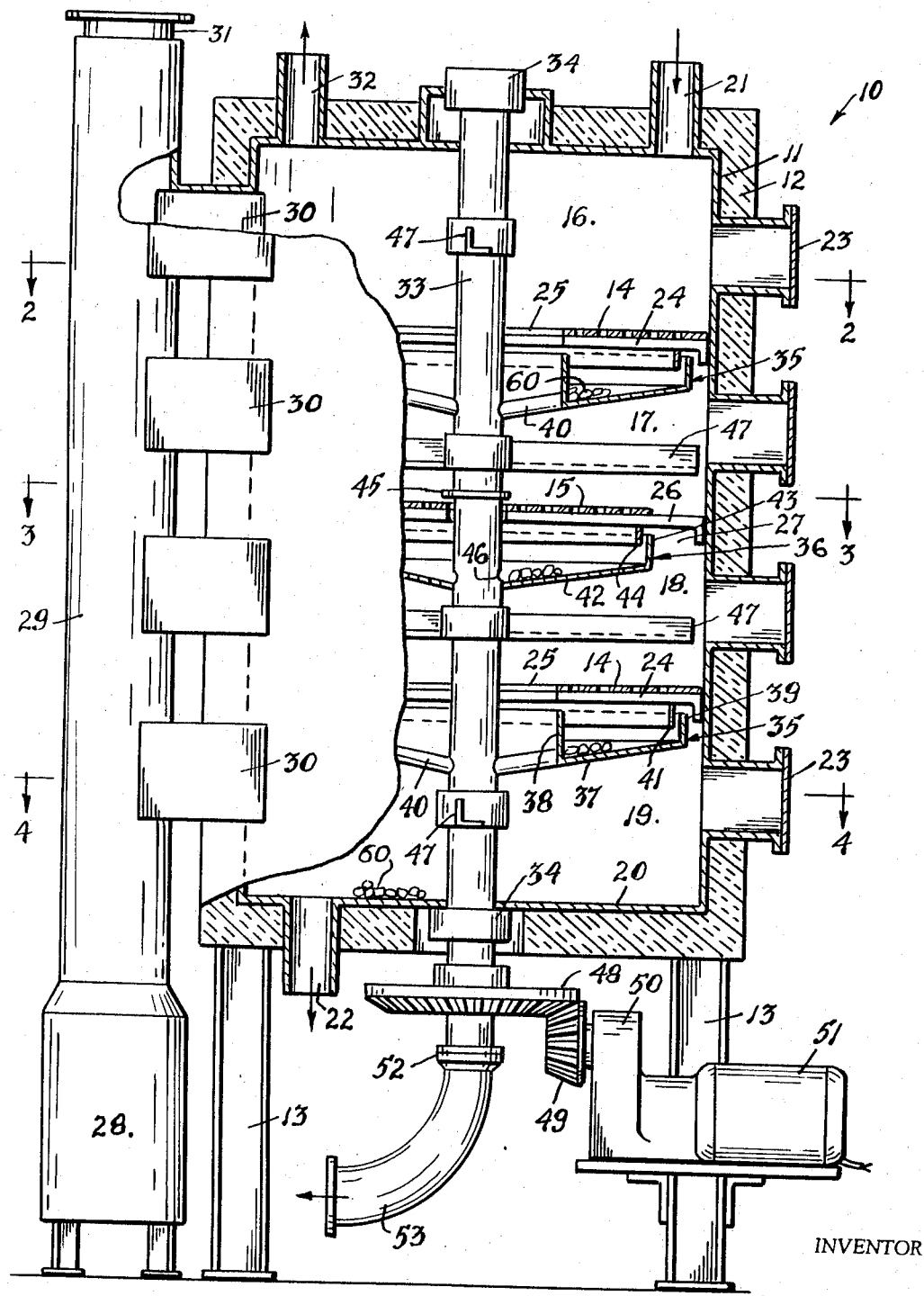
FIG-1-
INVENTOR
Emile J. Jemal
BY
Munson H. Lane
ATTORNEY

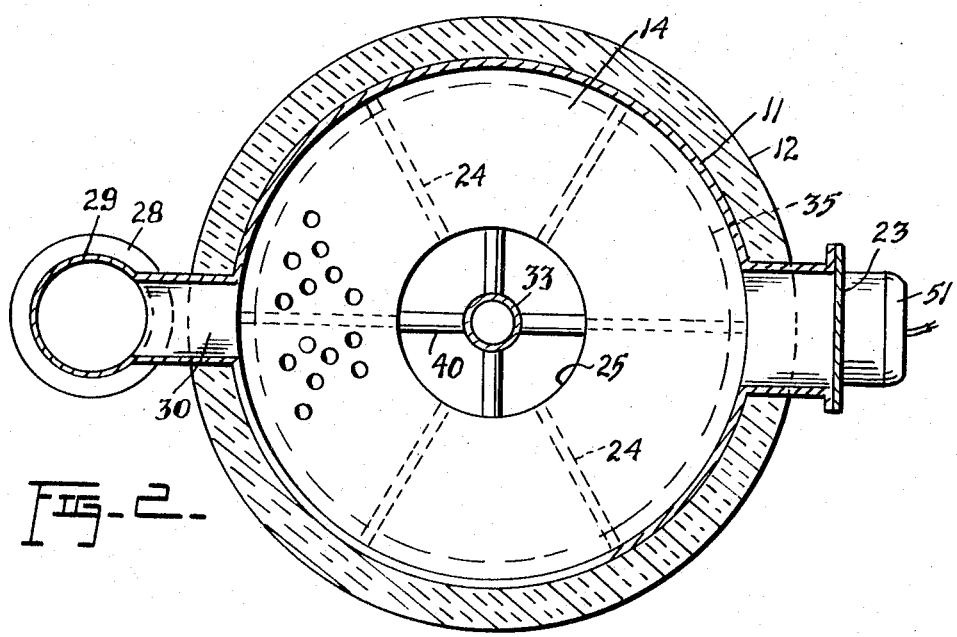
FIG-2-
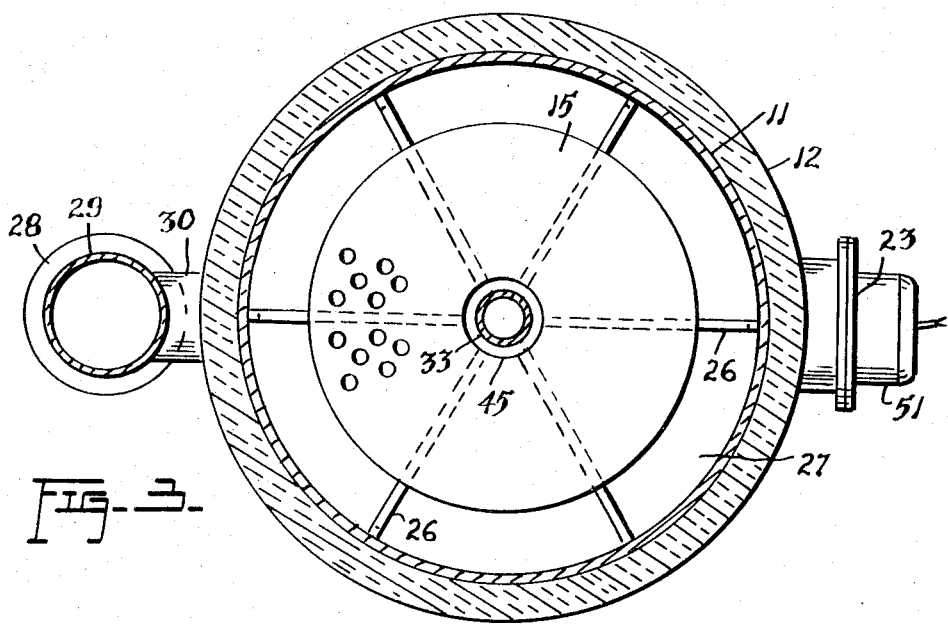
FIG-3-
INVENTOR
Emil J. Jemal
BY Munson H. Lane
ATTORNEY

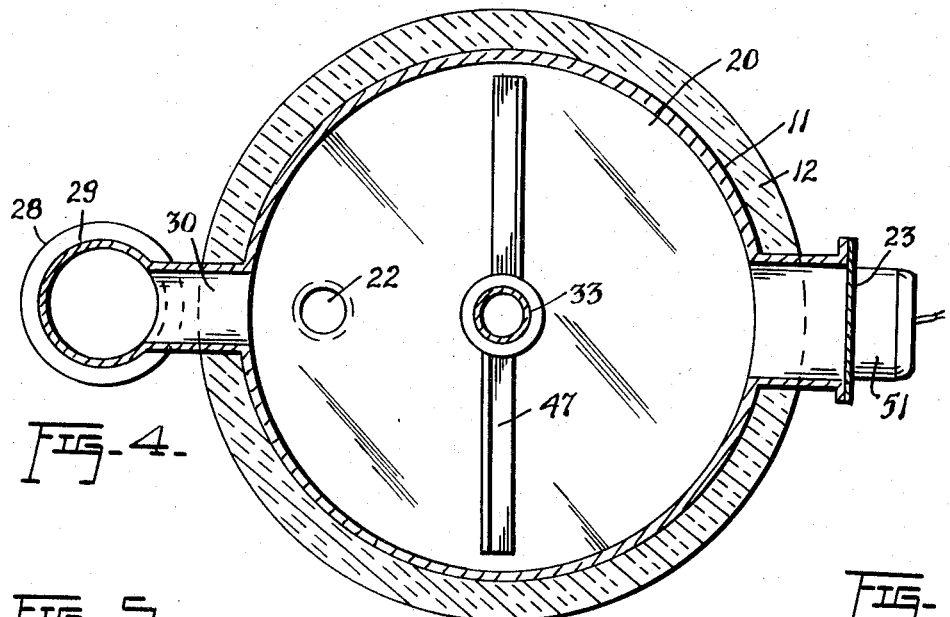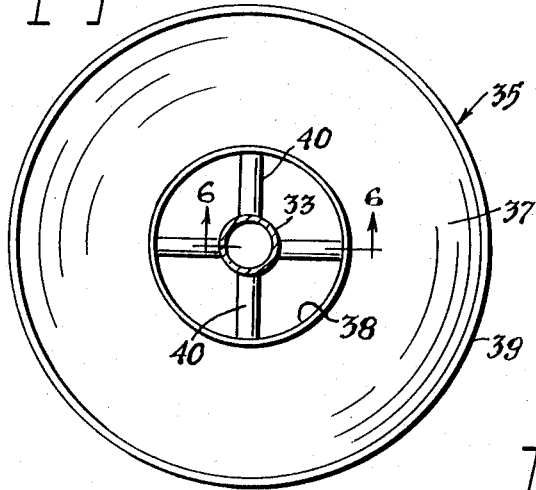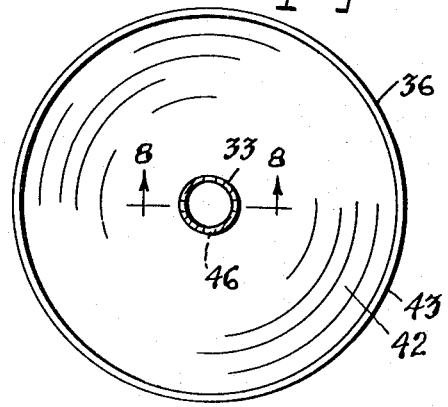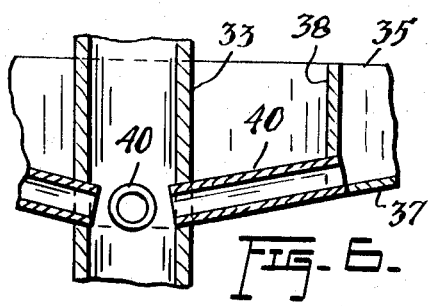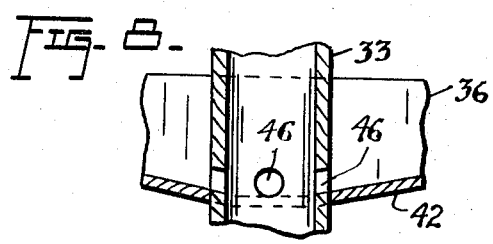

United States Patent Office 3,355,255
Patented Nov. 28, 1967

3,355,255
APPARATUS FOR RECOVERY OF TALLOW
Emile J. Jemal, Yonkers, N.Y., assignor to Mine and Smelter Supply Co., Denver, Colo., a corporation of Colorado
Filed Oct. 8, 1965, Ser. No. 494,024
11 Claims. (Cl. 23—280)

This invention relates to new and useful improvements in apparatus for recovery of tallow, and in particular the invention concerns itself with an apparatus for separation and recovery of tallow from waste animal flesh in slaughter houses, butcher shops, and the like.

The principal object of the invention is to provide an apparatus of the type herein described which may be conveniently employed for its intended purpose in a highly efficient and economical manner and, what is more important, in a continuous operation wherein animal flesh to be treated may be continously fed into the apparatus and tallow continuously recovered therefrom, as distinguished from conventional procedures which attempt the tallow recovery by treatment of a batch of material at one time.

Other advantages of the invention reside in its simplicity of construction, efficient operation, and in its adaptability to economical manufacture.

With the foregoing more important object and features in view and such other objects and features as may become apparent as this specification proceeds, the invention will be understood from the following description taken in conjunction with the accompanying drawings, wherein like characters of reference are used to designate like parts in the several views, and wherein:

FIGURE 1 is a view, partly in elevation and partly in vertical section, showing the apparatus of the invention;

FIGURE 2 is a cross-sectional view, taken substantially in the plane of the line 2—2 in FIG. 1;

FIGURE 3 is a cross-sectional view, taken substantially in the plane of the line 3—3 in FIG. 1;

FIGURE 4 is a cross-sectional view, taken substantially in the plane of the line 4—4 in FIG. 1;

FIGURE 5 is a plan view of one of the trays;

FIGURE 6 is an enlarged, fragmentary sectional detail, taken substantially in the plane of the line 6—6 in FIG. 5;

FIGURE 7 is a plan view of another one of the trays; and

FIGURE 8 is an enlarged, fragmentary sectional detail, taken substantially in the plane of the line 8—8 in FIG. 7.

Referring now to the accompanying drawings in detail, the apparatus of the invention which is designated generally by the reference numeral 10 is primarily intended for separation and recovery of tallow from waste animal flesh in slaughter houses, butcher shops, and the like.

The apparatus 10 is in the nature of a furnace which comprises a vertically elongated housing 11 enclosed by a jacket 12 of heat insulating material, the housing being supported by suitable legs 13. As such, the housing 11 is preferably cylindrical, and a set of vertically spaced, foraminous partitions 14, 15, 14 are provided in the housing, separating the interior thereof into a plurality of material treatment zones 16, 17, 18 and 19. In this regard it will be understood that the uppermost partition 14 defines the bottom of the uppermost housing zone 16; the partition 15 defines the bottom of the next underlying zone 17; the partition 14 below that defines the bottom of the next underlying zone 18; while the bottom of the zone 19 is defined by the bottom 20 of the housing.

A suitable inlet 21 for material to be treated is provided at the top of the housing in communication with the uppermost housing zone 16, while a suitable outlet 22 for waste material after treatment is provided at the bottom of the housing in communication with the lowermost zone 19. Also, several access doors 23 are provided through the side of the housing for the respective zones 16, 17, 18 and 19, as will be apparent.

The partitions 14 are supported by radial rods 24 which underlie these partitions and have angulated outer ends rigidly secured to the side wall of the housing, while their inner ends terminate at the inner edges of the partitions 14 which define circular openings of spaces 25 so that excess material on each partition may drop down into the next underlying treatment zone. In between the two partitions 14 is the intermediate partition 15 supported by the radial rods 26 which also have angulated outer ends secured to the side wall of the housing, although it will be noted that the partition 15 is of a smaller diameter than the housing so that a space 27 exists around the outside of the partition 15 for dropping of material from the zone 17 into the zone 18. Thus, after the material to be treated is discharged through the inlet 21 into the uppermost zone 16 on the partition 14 thereof, in its treatment the material drops through the opening or space 25 in the uppermost partition 14 onto the partition 15 at the bottom of the zone 17, then dropping around the outside of the partition 15 through the space 27 onto the partition 14 at the bottom of the zone 18, and finally dropping through the space 25 of the last mentioned partition 14 into the lowermost zone 19 on the bottom 20 of the housing, from where it is discharged through the material outlet 22. As such, the material discharged through the outlet 22 is waste animal flesh from which tallow has been separated and recovered as will be hereinafter described.

Positioned outside of the housing 11 is a suitable burner, such as a gas burner, or the like, indicated at 28, the same having a stack 29 with laterally extending ducts 30 for discharge of hot gases into the respective zones 16, 17, 18 and 19 of the housing, such hot gases serving to heat the flesh material on the several partitions 14, 15, 14 and to melt the tallow present in such material. The stack 29 may be equipped with a restricted outlet cap 31, while hot gases passing into the housing 11 may escape through a gas outlet 32 provided at the top of the housing in communication with the uppermost housing zone 16.

For purposes of recovering the tallow which has been melted by the hot gases and separated from the flesh on the partitions 14, 15, 14, a vertical, hollow shaft 33 is rotatably mounted centrally in the housing 11 by means of suitable bearings 34. The shaft 33 carries a plurality of melted tallow collecting trays 35, 36, 35 which are rotatable with the shaft and are disposed under the respective foraminous partitions 14, 15, 14, as will be clearly apparent, so that melted tallow passing through the foraminous partitions may be collected in the trays.

Each of the trays 35 has an annular configuration with a frusto-conical, radially inwardly sloping bottom 37, an inner marginal wall 38 and an outer marginal wall 39 as is best shown in FIG. 5, the inner marginal wall 38 being spaced radially away from the shaft 33 to provide clearance or space in alignment with the opening or space 25 in the overlying partition 14 for passage of material from one zone of the housing into the next underlying zone. The trays 35 are mounted in position on the shaft 33 by a set of tubular members 40 which are open-ended and communicate each tray 35 with the interior of the shaft 33. The tubular members 40 extend radially outwardly from the shaft 33 to the inner wall 38 of the trays 35 and the open ends of these members permit melted tallow to drain from the trays into the hollow shaft 33. In order to avoid any possibility of tallow overflow or splashing beyond the outer marginal wall 39 of the trays 35, an annular depending lip 41 is secured to the underside of the rods 24 which support the partitions 14, the lips 41 vertically overlapping the outer marginal wall 39, as shown.

The intermediate tray 36 has a frusto-conical radially inwardly sloping bottom 42 and a marginal rim or flange 43, the bottom 42 being secured directly to the shaft 33, while the rim 43 is spaced away from the side wall of the housing 11 to provide the material passage 27, already mentioned. Here again, a depending annular lip 44 is secured to the underside of the rods 26 supporting the partition 15, the lip 44 vertically overlapping the tray rim 43 to prevent spilling or splashing of melted tallow outwardly from the tray. As will be apparent, a suitable deflector plate 45 is mounted on the shaft 33 immediately above the partition 15 to prevent untreated material from flowing or passing around the shaft directly into the tray 36. The shaft 33 is provided, as is best shown in FIG. 8, with a plurality of apertures 46 which communicate with the tray 36 and facilitate drainage of melted tallow from that tray into the hollow shaft.

In order to promote the tallow extracting operation and to facilitate passage of material under treatment from one housing zone into the next, a plurality of agitators 47 are provided on the shaft 33 and are rotatable therewith, one such agitator being disposed in each of the housing zones 16, 17, 18 and 19. As shown, the agitators may simply consist of angle bars affixed to a hub on the shaft 33, as will be apparent from FIG. 4.

The shaft 33 projects downwardly from the housing 11 and carries a bevel gear 48 meshing with a pinion 49 driven through a suitable reduction gearing box 50 by a motor 51, whereby rotation of the shaft 33 along with the trays 35, 36, 35 and agitators 47 is effected.

The lower end of the shaft 33 is connected by a rotary coupling 52 to a relatively stationary outlet 53 through which the reclaimed tallow is delivered.

If desired, suitable purifying agent 60 such as charcoal, that is, so-called activated charcoal, may be positioned in the trays 35, 36, 35, and also on the bottom 20 of the housing 11 for purifying and/or deodorizing the extracted tallow before its delivery through the outlet 53.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In an apparatus for recovery of tallow from waste animal flesh material, the combination of a vertically elongated housing, a plurality of foraminous partitions disposed in vertically spaced relation in said housing and separating the interior thereof into a plurality of material treatment zones, means for delivering material to be treated into the uppermost zone in said housing, said partitions leaving spaces so that material under treatment in one zone may drop into the next underlying zone and successively into the lowermost zone in the housing, means for delivering hot gases into the several zones of the housing to melt and extract tallow from materials on the respective partitions thereof, a hollow vertical shaft extending through the housing, a set of trays mounted on said shaft below the respective partitions for reception of melted tallow gravitating through the foraminous partitions from the material under treatment thereon, means for discharging melted tallow from said trays into said hollow shaft, and means for discharging material after treatment from the lowermost zone of said housing.

2. The apparatus as defined in claim 1 wherein said shaft is rotatably mounted in said housing, said trays being rotatable with said shaft, and means for rotating the shaft.

3. The apparatus as defined in claim 1 together with means for discharging hot gases from the uppermost zone of said housing.

4. The apparatus as defined in claim 1 wherein said spaces left by said partitions are located alternately around the outer side of said housing and around said shaft.

5. The apparatus as defined in claim 1 together with a tallow purifying agent positioned in said trays.

6. The apparatus as defined in claim 1 together with a tallow purifying agent positioned in the lowermost zone of said housing.

7. The apparatus as defined in claim 1 together with a jacket of heat insulating material surrounding said housing.

8. The apparatus as defined in claim 1 wherein each of said trays includes an upturned marginal flange, each of said partitions being provided at the underside thereof with a depending lip in vertically overlapping juxtaposed relation to said flange.

9. The apparatus as defined in claim 1 wherein at least one of said trays has an annular configuration with its inner edge spaced radially outwardly from said shaft to leave said space for dropping of material into the next underlying zone in said housing, together with tubular members extending from said shaft to the inner edge of said one of said trays for mounting the same in position on the shaft, said tubular members being open ended and in communication with the tray and with the interior of said hollow shaft to provide said means for discharging melted tallow from the tray into the shaft.

10. The apparatus as defined in claim 1 wherein at least one of said trays has a bottom wall secured directly to said shaft and an outer marginal edge spaced radially inwardly from said housing to leave said space for dropping of material into the next underlying zone in the housing, said shaft being provided with openings communicating with said one of said trays to provide said means of discharging melted tallow from the tray into the shaft.

11. The apparatus as defined in claim 1 together with a set of agitators secured to and rotatable with said shaft below the respective trays.

References Cited

UNITED STATES PATENTS

| 254,279 | 2/1882 | Cosine | 260—412.6 |
| 2,075,070 | 3/1937 | Upton | 210—179 |
| 3,107,217 | 10/1963 | Muller | 210—344 X |

FOREIGN PATENTS 2,357 10/1912 Great Britain.

REUBEN FRIEDMAN, *Primary Examiner.*

C. DITLOW, *Assistant Examiner.*